(12) United States Patent
Lee

(10) Patent No.: US 6,679,665 B2
(45) Date of Patent: Jan. 20, 2004

(54) APPARATUS FOR HOLDING PIN IN PIN-COUPLED STRUCTURE

(75) Inventor: Sang Woo Lee, Kyungki-do (KR)

(73) Assignee: Soosan Heavy Industries Co., Ltd., Kyungki-do (KR)

( * ) Notice: Subject to any disclaimer, the term of this patent is extended or adjusted under 35 U.S.C. 154(b) by 0 days.

(21) Appl. No.: 10/090,367

(22) Filed: Mar. 4, 2002

(65) Prior Publication Data
US 2003/0113184 A1 Jun. 19, 2003

(30) Foreign Application Priority Data

Dec. 17, 2001 (KR) .......................... 2001-80072
Dec. 20, 2001 (KR) .......................... 2001-39438

(51) Int. Cl.[7] ............................ F16B 19/00; F16B 21/00
(52) U.S. Cl. ..................... 411/347; 411/348; 411/508; 411/512
(58) Field of Search ................. 411/347, 348, 411/508, 509, 510, 512, 514, 360

(56) References Cited

U.S. PATENT DOCUMENTS

| | | | | |
|---|---|---|---|---|
| 1,023,985 A | * | 4/1912 | Beaulieu | 411/347 |
| 1,655,750 A | * | 1/1928 | Campo | 411/347 |
| 2,171,648 A | * | 9/1939 | Ennis et al. | 411/347 X |
| 2,405,400 A | * | 8/1946 | Butterfield | 411/348 |
| 3,019,537 A | * | 2/1962 | Stephenson | 411/512 X |
| 3,020,655 A | * | 2/1962 | Launder | 411/512 X |
| 4,823,487 A | * | 4/1989 | Robinson | 411/514 X |

OTHER PUBLICATIONS

Korean Industrial Standards KS B 1336–85.
Korean Industrial Standards KS B 1339–85.

* cited by examiner

Primary Examiner—Neill Wilson
(74) Attorney, Agent, or Firm—Renner, Otto, Boisselle & Sklar, LLP

(57) ABSTRACT

An apparatus, used for holding a coupling pin at a desired position in a pin-coupled structure regardless of a relative movement of two or more pin-coupled parts in the structure, is disclosed. This pin holding apparatus has two pin holding blocks, with an elastic member interposed between the two pin holding blocks, and is inserted into a pin slot with the two holding blocks radially compressed by an external force to reduce the outer diameter of the apparatus. The apparatus elastically expands in the pin slot due to the restoring force of the compressed elastic member when the external force is removed from the apparatus, thus being set in an annular groove formed on the inner surface of the pin slot and holding the pin at its desired position in the pin slot. The pin holding apparatus is easily set in and removed from the pin slot. This pin holding apparatus also has an elastic cushion, which is positioned at the junction of the pin and the pin holding apparatus, thus almost completely preventing a breakage of the pin.

15 Claims, 7 Drawing Sheets

APPARATUS FOR HOLDING PIN IN PIN-COUPLED STRUCTURE

BACKGROUND OF THE INVENTION

1. Field of the Invention

The present invention relates, in general, to an apparatus for holding a coupling pin at a desired position in a pin-coupled structure, regardless of a relative movement of two or more coupled parts in the structure, and, more particularly, to a pin holding apparatus, which has two semicircular pin holding blocks with an elastic member interposed between the two pin holding blocks, and is inserted into a pin slot with the two holding blocks radially compressed by an external force to reduce the outer diameter of the apparatus, and elastically expands in the pin slot due to the restoring force of the compressed elastic member when the external force is removed, thus being set in an annular groove formed on the inner surface of the pin slot and holding a pin at its desired position in the pin slot.

2. Description of the Prior Art

As well known to those skilled in the art, a pin-coupled structure has been typically used in a variety of machines and other structures. In order to couple two or more parts of a machine or a structure to each other using a coupling pin in the prior art, a pin slot is formed at a desired position of each part. The parts are, thereafter, coupled together by inserting a coupling pin into the aligned pin slots of the parts. An example of such conventional pin-coupled structures is shown in FIG. 1.

FIG. 1 shows a breaker used as an attachment of a power excavator and having a conventional pin holding apparatus. As shown in the drawing, a breaker drill 103 along with a plurality of locking members is inserted into a drill hole of a drill support block 102, and is held at a desired position in the support block 102 by means of a plurality of pins 101 and stoppers 105. During a breaking work using the breaker, the breaker drill 103 generates intensive vibrations to loosen the pins 101. In an effort to hold the pins 101 in their positions regardless of such vibrations, the stoppers 105 are used. However, the stoppers 105 are also gradually loosened by such vibrations and cannot effectively hold the pins 101 in their positions for a desired lengthy period of time. In the pin holding apparatus used in this breaker, each of the stoppers 105 comprises a rubber peg driven into a pin slot after inserting a pin 101 into the pin slot, and the rubber peg is stopped using both a stop ring and a plug bolt.

As shown in FIGS. 2a and 2b showing a conventional pin holding apparatus used in such a pin-coupled structure, a snap ring 200 manufactured according to the Korean Industrial Standards, KS B 1336-85, is used as a stop ring. This snap ring 200 has a gap formed therein, thus having elasticity. That is, such a snap ring 200 is inserted into a pin slot 201 while being compressed, and is released in the pin slot, so the snap ring 200 elastically expands to restore its original shape, and stops a pin 202 in the pin slot 201. However, the thickness of the snap ring 200 is limited since it is very difficult to form an annular shape of the ring 200 with desired elasticity when the thickness of the ring 200 exceeds a predetermined level. Therefore, the snap ring 200 is somewhat thin, so the ring seat groove formed on the inner surface of the pin slot 201 for seating the ring 200 therein fails to have a desired effective depth.

In order to hold the pin 202 in the pin slot 201, the pin 202 is first inserted into the pin slot 201. Thereafter, a rubber peg 204 is driven into the pin slot 201 until it is positioned at the end of the pin 202. The snap ring 200 is, thereafter, set in the pin slot 201 to stop the rubber peg 204. However, when the pin 202 is repeatedly vibrated in such a pin-coupled structure, vibration impact is repeatedly transmitted to the snap ring 200 through the rubber peg 204, thus forcing the ring 200 to be removed from its original position and fail to stop the rubber peg 204. In such a case, the pin 202 may be undesirably removed from the pin slot 201, and disconnect the coupled parts from each other.

FIG. 3 shows another embodiment of conventional pin holding apparatuses. This conventional pin holding apparatus uses a spring pin 300 manufactured according to the Korean Industrial Standards, KS B 1339-85. In this pin holding apparatus, the spring pin 300 is manufactured by rolling a steel plate having elasticity allowing the pin 300 to be elastically compressed and expanded in a radial direction within a predetermined range. This spring pin 300 is forcibly fitted into a pin slot to accomplish a pin holding effect. However, this spring pin 300 undesirably gradually loses its original elasticity when it is used in a pin-coupled structure generating intensive vibrations for a lengthy period of time. In such a case, the spring pin may be unexpectedly removed from the pin slot, and fail to continue performing its pin holding function, thus disconnecting the coupled parts from each other.

SUMMARY OF THE INVENTION

Accordingly, the present invention has been made keeping in mind the above problems occurring in the prior art, and an object of the present invention is to provide a pin holding apparatus, which has two pin holding blocks with an elastic member interposed between the two pin holding blocks, and holds a pin at its desired position inside a pin slot by the protruding semicircular portions of the pin holding blocks set in an annular groove formed on the inner surface of the pin slot.

Another object of the present invention is to provide a pin holding apparatus, which is easily set in and removed from the pin slot.

A further object of the present invention is to provide a pin holding apparatus, which effectively holds the pin in the pin slot for a desired lengthy period of time regardless of vibrations of the pin-coupled parts, thus maintaining the stable coupling of the parts, and which has an elastic cushion positioned at the junction of the pin and the pin holding apparatus, thus almost completely preventing a breakage of the pin.

In order to accomplish the above objects, an embodiment of this invention provides an apparatus for holding a pin in a pin-coupled structure consisting of two or more parts each having a pin slot, with an annular groove formed on the inner surface of the pin slot at a position around an end of the pin slot, and a pin set in the pin slot to couple the parts to each other, wherein the apparatus comprises: two pin holding blocks each having a protruding portion on the external surface thereof and made of an incompressible material; and an elastic member interposed between the two blocks, whereby the apparatus is inserted into the pin slot while being compressed in a radial direction by an external force to reduce the outer diameter thereof, and is released from the external force, so the apparatus elastically expands by a restoring force of the elastic member and the protruding portions of the two blocks are seated in the annular groove, thus holding the pin in the pin slot without allowing the pin to be undesirably removed from the pin slot regardless of a relative movement of the pin-coupled parts.

Another embodiment of this invention provides an apparatus for holding a pin in a pin-coupled structure consisting of two or more parts each having a pin slot, with an annular groove formed on the inner surface of the pin slot at a position around an end of the pin slot, and a pin set in the pin slot to couple the parts to each other, wherein the apparatus comprises: two pin holding blocks each having a protruding portion on the external surface thereof and made of an incompressible material; an elastic member interposed between the two blocks; and an elastic cushion having a cross-section similar to that of the pin and covering the lower ends of the two blocks and the elastic member, whereby the apparatus is inserted into the pin slot while being compressed in a radial direction by an external force to reduce the outer diameter thereof with the elastic cushion coming into contact with an end of the pin, and is released from the external force, so the apparatus elastically expands by a restoring force of the elastic member and the protruding portions of the two blocks are seated in the annular groove, thus holding the pin in the pin slot without allowing the pin to be undesirably removed from the pin slot regardless of a relative movement of the pin-coupled parts.

BRIEF DESCRIPTION OF THE DRAWINGS

The above and other objects, features and other advantages of the present invention will be more clearly understood from the following detailed description taken in conjunction with the accompanying drawings, in which:

FIGS. 2a and 2b are views showing a conventional pin holding apparatus using a stop ring, in which:

FIG. 2a is a side sectional view of the pin holding apparatus; and

FIG. 2b is a front sectional view of the pin holding apparatus;

FIGS. 5a and 5b are views showing the pin holding apparatus of FIG. 4, in which:

FIG. 5a is a plan view of the pin holding apparatus; and

FIG. 5b is a side view of the pin holding apparatus; using a spring pin;

DETAILED DESCRIPTION OF THE INVENTION

Figure 1:
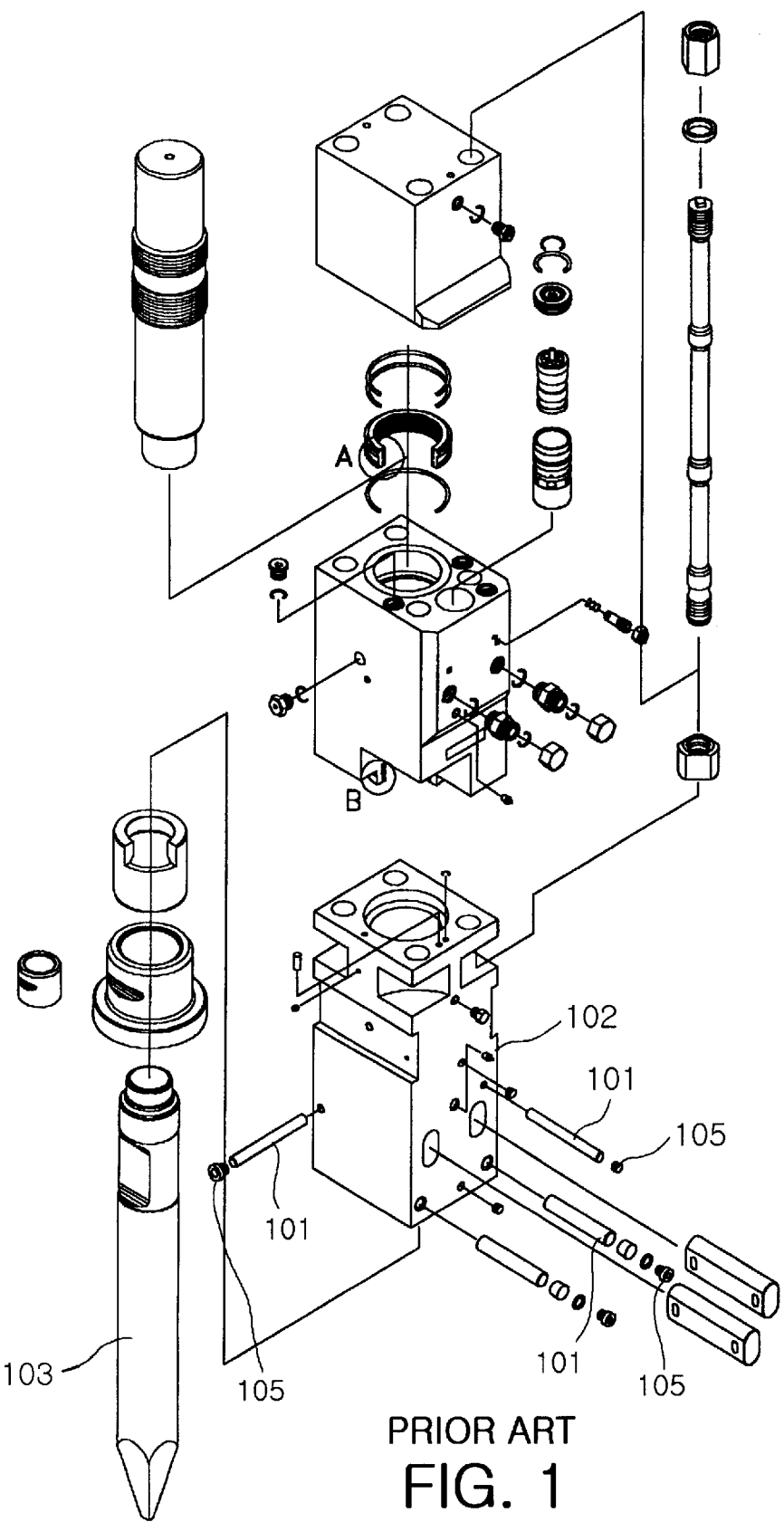
FIG. 1 is an exploded perspective view of a breaker, which is used as an attachment of a power excavator and has a conventional pin holding apparatus.
Figure 2A:
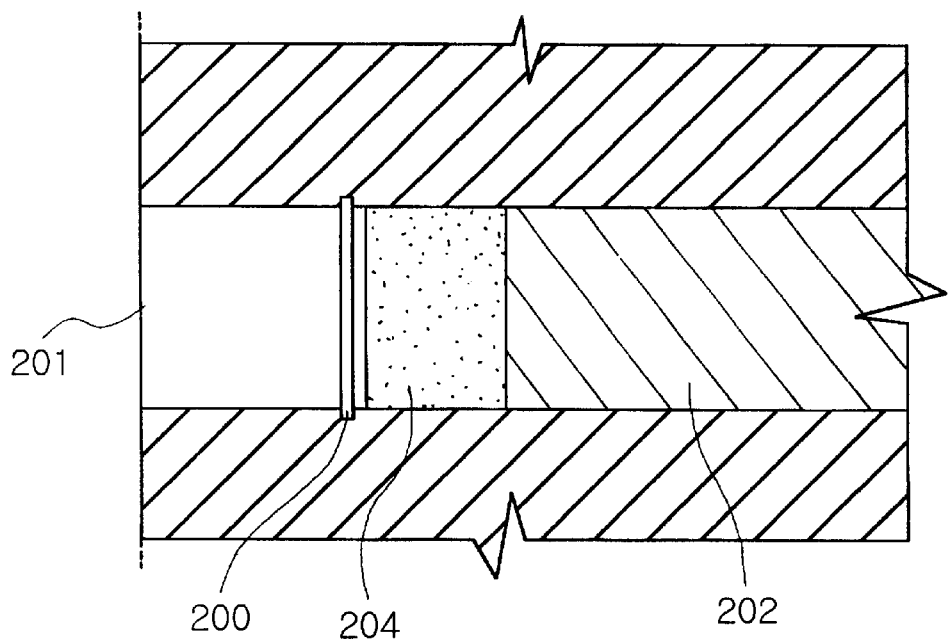
Figure 2B:
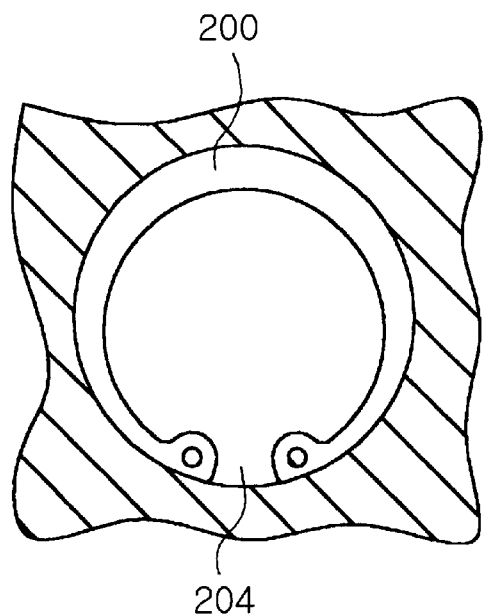
Figure 3:
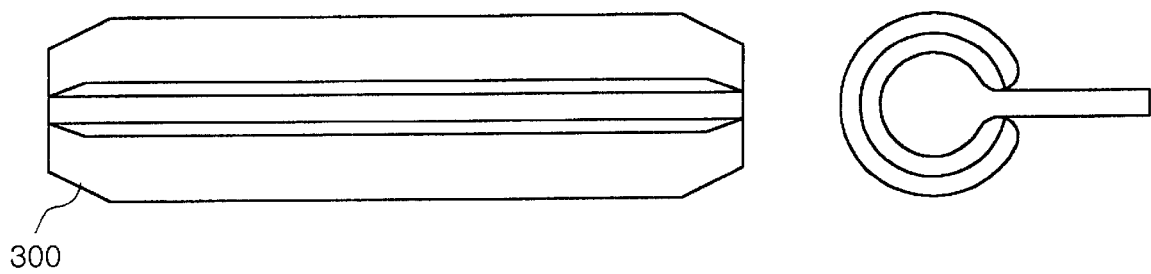
FIG. 3 is a view showing a conventional pin holding apparatus using a spring pin.

Reference now should be made to the drawings, in which the same reference numerals are used throughout the different drawings to designate the same or similar components.

Figure 4:
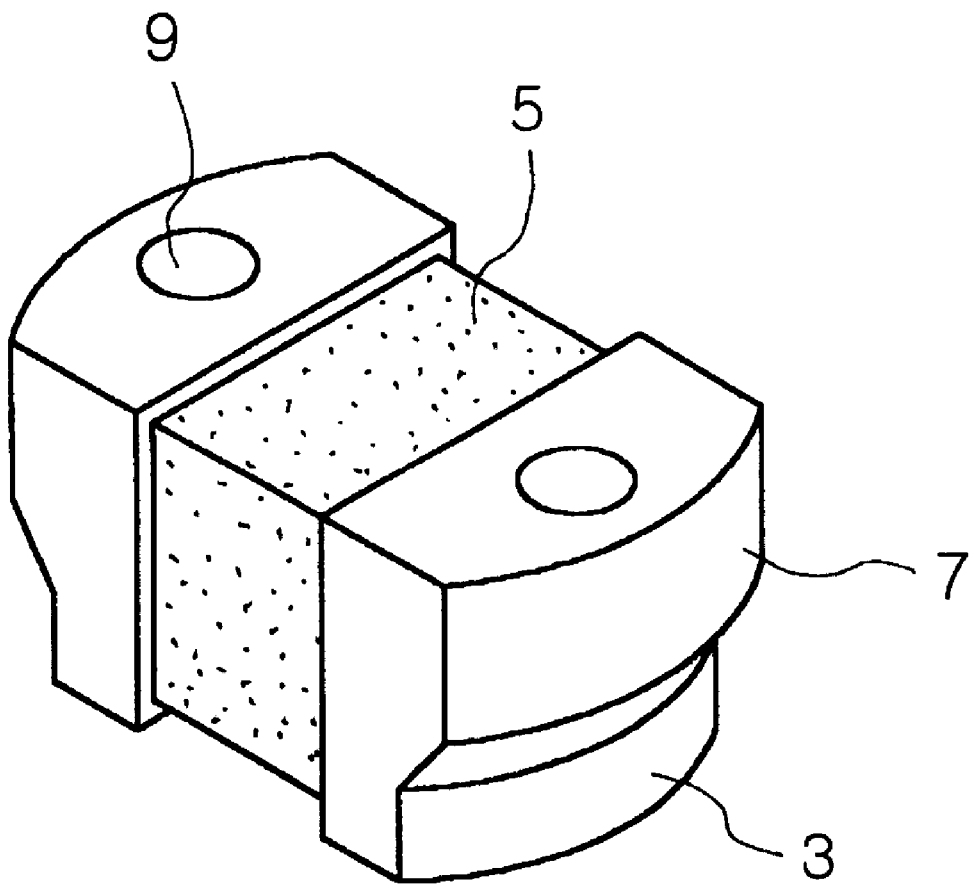
FIG. 4 is a perspective view of a pin holding apparatus in accordance with the primary embodiment of the present invention.
Figure 5A:
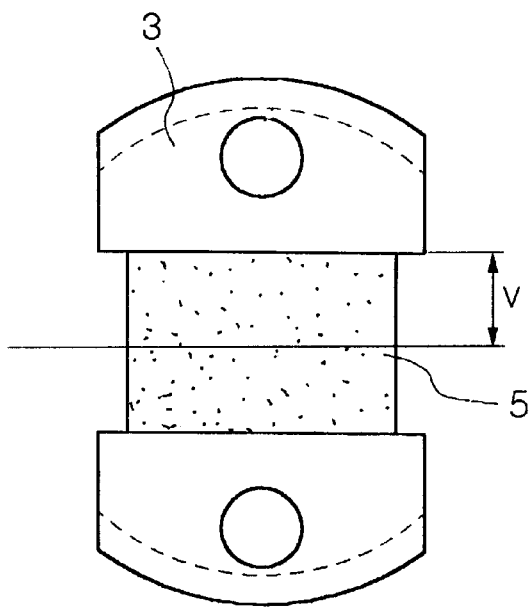
Figure 5B:
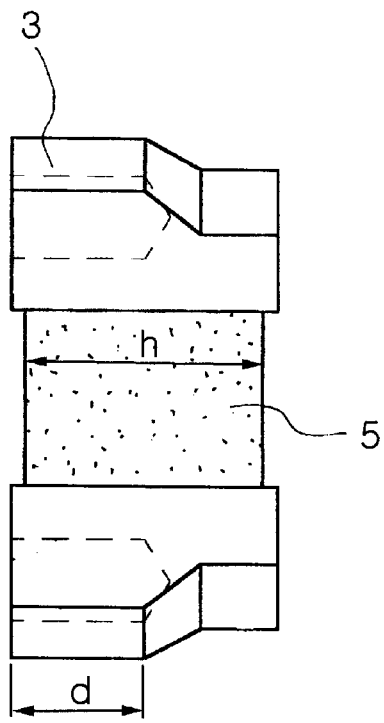

FIG. 4 is a perspective view of a pin holding apparatus in accordance with the primary embodiment of the present invention. FIGS. 5a and 5b are views showing the pin holding apparatus of FIG. 4, in which FIG. 5a is a plan view and FIG. 5b is a side view.

As shown in the drawings, the pin holding apparatus has a cylindrical profile. This apparatus has two pin holding blocks 3, each of which is made of incompressible strong material. Preferably, the blocks 3 are made of steel. Each of the two blocks 3 has an arc-shaped surface on its outside surface, and a flat surface on its inside surface. The two blocks 3 are oppositely positioned such that their flat inside surfaces face each other. Both sides of each block 3 are cut to form flat surfaces, and the two flat side surfaces of the block 3 meet the flat inside surface at right angles. Each of the two blocks 3, having such flat surfaces except for the arc-shaped outside surface, is provided with a protruding semicircular portion 7 on the arc-shaped outside surface.

The protruding semicircular portion 7 is formed along the arc-shaped outside surface of each block 3, and radially protrudes from the remaining part of the outside surface to have a predetermined protruding thickness. The protruding portion 7 may be formed at a desired portion of the outside surface of the block 3, but is preferably formed along the upper portion of the outside surface. In the preferred embodiment, the protruding portion 7 is continuously formed along the upper portion of the arc-shaped outside surface of each block 3 from one side surface to the other side surface of the block 3. The lower edge of the protruding portion 7 is integrated with the other part of the arc-shaped outside surface through an inclined junction surface, which is inclined at an angle of about 30°. Due to the inclined junction surface, it is possible to easily and smoothly insert the pin holding apparatus of this invention into a desired pin slot.

In the present invention, it is preferable to design the width "d" of the protruding portion 7 such that the width "d" is set to 50% or less than the height of the block 3 in an effort to give convenience to a user while fitting the pin holding apparatus into a pin slot. That is, when the width "d" of the protruding portion 7 exceeds 50% of the height of the block 3, it is difficult to compress the pin holding apparatus, thus being very inconvenient to the user while fitting the apparatus into a pin slot.

An elastic member 5 is interposed between the two pin holding blocks 3 to support the two blocks 3. In the present invention, the elastic member 5 is preferably made of rubber as shown in the drawing, but it should be understood that the elastic member 5 may be selected among the other elastically compressible materials, such as compression springs. However, it is necessary to design the elastic member 5 such that the member 5 has a predetermined elasticity. In the case of an elastic member made of rubber, it is preferable to use rubber having a shore hardness of about 50~90, and most preferable to use synthetic rubber having a shore hardness of about 70. When the elastic member 5 is designed to have such shore hardness, a user can compress the elastic member 5 when strongly compressing the two blocks 3 using a tool, but cannot compress the elastic member 5 when manually compressing the two blocks 3 with hands or fingers. In order to integrate the parts of the pin holding apparatus of this invention, the elastic member 5 is interposed between the two blocks 3, and is bonded to the blocks 3 using a bonding agent, prior to being subjected to a pressing process using a press forming machine.

When the elastic member 5 is made of rubber as described in the preferred embodiment of this invention, the elastic member 5 is preferably designed to be slightly wider than each block 3. In such a case, the width of the rubber elastic member 5 is designed in consideration of the width of the block 3 having the protruding portion 7. That is, it is preferable to design the half width "v" of the rubber elastic member 5 such that it is set to 20~50% of the distance from the center of the elastic member 5 to the center of the rounded outside edge of the protruding portion 7 of each block 3. In addition, the length "h" of the rubber elastic member 5 is designed such that it is slightly smaller than that of each block 3, so both side surfaces of the elastic member 5 do not protrude outside the side surfaces of the two blocks 3 when the elastic member 5 is compressed to expand in a lengthwise direction.

Each of the two pin holding blocks 3 has a cylindrical hole 9 on its upper surface for allowing a user to use a tool, such as a plier, when fitting the pin holding apparatus into a pin slot. That is, when it is desired to fit the pin holding apparatus into a desired pin slot, a user inserts the clamp arms of a plier into the holes 9 of the two blocks 3, and radially compresses the two blocks 3 while overcoming the restoring force of the elastic member 5 by actuating the plier, so the outer diameter of the pin holding apparatus is reduced and the user can fit the apparatus into the pin slot. When the pin holding apparatus is set in the pin slot such that the protruding portions 7 of the two blocks 3 are aligned with an annular groove formed on the inner surface of the pin slot, the plier is removed from the holes 9. The two blocks 3 elastically expand by the restoring force of the compressed elastic member 5, so the protruding portions 7 of the two blocks 3 are seated in the annular groove to hold the pin at its desired position in the pin slot.

Figure 6:
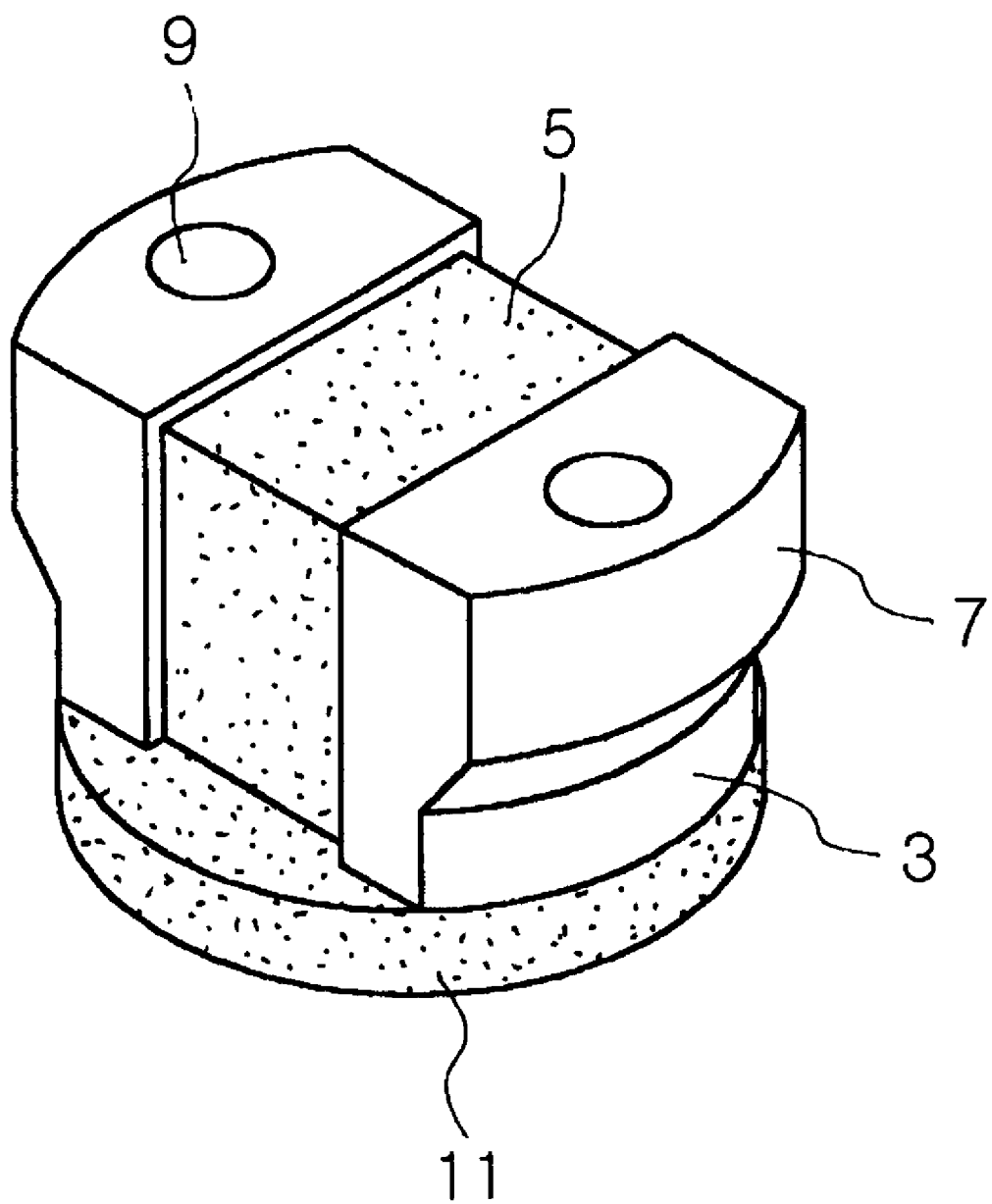
FIG. 6 is a perspective view of a pin holding apparatus in accordance with the second embodiment of the present invention.

FIG. 6 is a perspective view of a pin holding apparatus in accordance with the second embodiment of the present invention. In this second embodiment, the general shape of the pin holding apparatus remains the same as that described for the primary embodiment, but an elastic cushion 11 is attached to the end of the pin holding apparatus such that the elastic cushion 11 is positioned at the junction of the pin and the pin holding apparatus when the apparatus is set in a pin slot to hold a pin in the pin slot. The elastic cushion 11 is preferably made of the same material as that of the elastic member 5 interposed between the two blocks 3. More preferably, the elastic cushion 11 is cast with the elastic member 5 into a single elastic body. The elastic cushion 11 has a disc shape. The lower surface of the cushion 11 may be flattened. However, it is preferable to form the lower surface of the cushion 11 to be concave. When the elastic cushion 11 has such a concave lower surface, the outside edge of the lower surface of the cushion 11 comes into contact with the end of a pin set in a pin slot. Therefore, the force applied from the pin to the pin holding apparatus is transmitted to the circumferential surface of the protruding portions 7 of the blocks 3, so no moment acts in the apparatus. This creates an improved operational effect of the pin holding apparatus.

Figure 7:
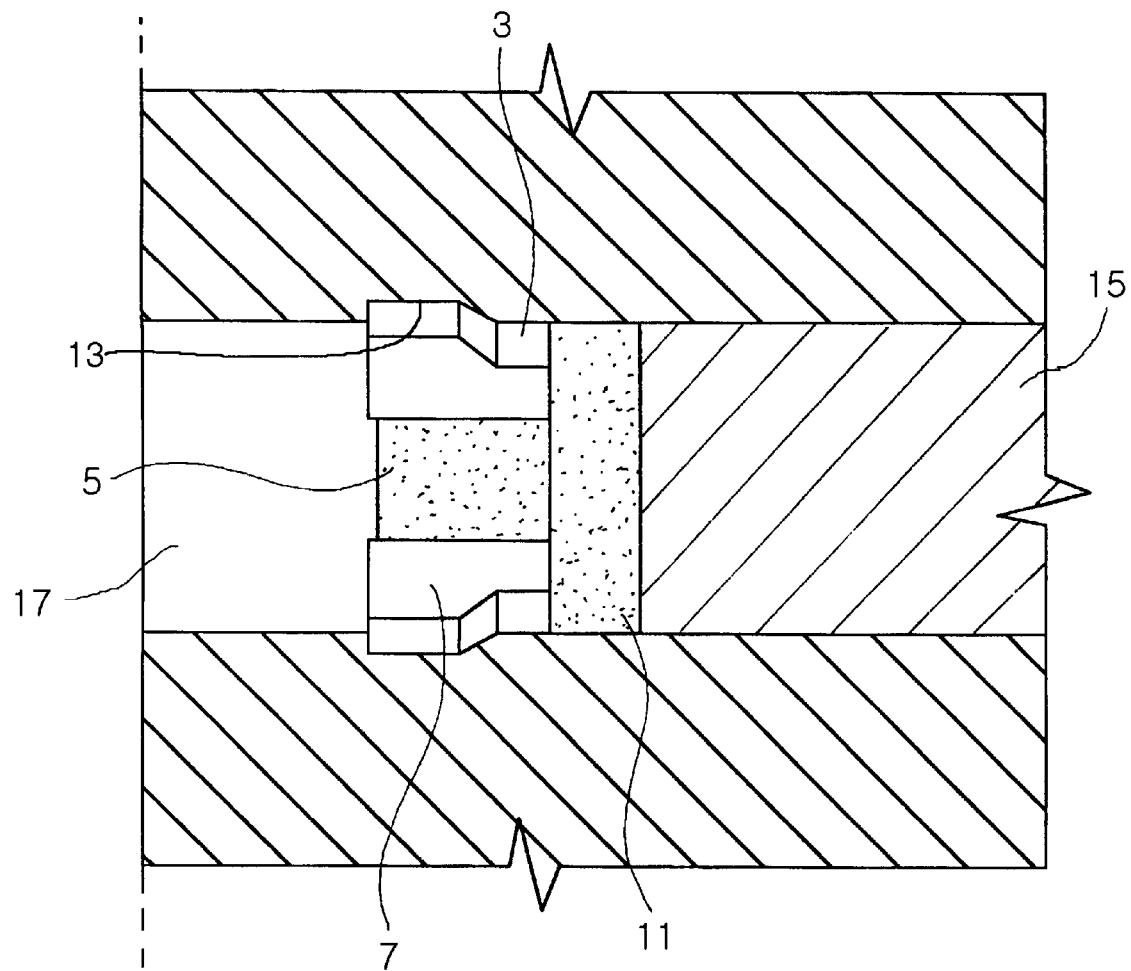
FIG. 7 is a side sectional view of the pin holding apparatus of this invention set in a pin slot for holding a pin in the pin slot.

The operational effect of the pin holding apparatus according to the present invention will be described herein below with reference to the accompanying drawings. FIG. 7 is a side sectional view of the pin holding apparatus according to the second embodiment of this invention set in a pin slot for holding a pin in the pin slot.

The pin holding apparatus of this invention is driven into a pin slot 17 to stop a pin 15 set in the pin slot 17, thus holding the pin 15 at a desired position inside the pin slot 17. An annular groove 13 is formed on the inner surface of the pin slot 17 at a predetermined position, and seats the protruding portions 7 of the apparatus therein, thus stopping the apparatus in the pin slot 17. When fitting the pin holding apparatus into the pin slot 17, an appropriate tool, such as a plier, is used for compressing the apparatus to reduce the outer diameter of the apparatus. When the pin holding apparatus is set in the pin slot 17 such that the protruding portions 7 are aligned with the annular groove 13 of the pin slot 17, the tool is removed from the holes 9. The two blocks 3 thus elastically expand by the restoring force of the compressed elastic member 5, so the protruding portions 7 of the two blocks 3 are seated in the annular groove 13 to hold the pin 15 at its desired position in the pin slot 17.

The pin holding apparatus of this invention uses two pin holding blocks, each of which is stronger and thicker than a conventional snap ring or a conventional spring ring used as a pin holding apparatus in the prior art. The pin holding apparatus of this invention is easily and simply set in a pin slot by only inserting the apparatus into the pin slot, and firmly holds a pin set in the pin slot. In the present invention, the depth of the annular groove 13 formed on the inner surface of the pin slot 17 may be somewhat freely designed in consideration of a variety of design factors, such as the diameter of the pin slot 17 and an expected force applied to the pin 15. Of course, it is necessary to design the dimension of the pin holding apparatus of this invention in accordance with such design factors to meet the depth of the annular groove 13.

When completely setting the pin holding apparatus in the pin slot, the elastic cushion 11 comes into contact with the end of the pin 15, and absorbs impact applied from the pin 15, thus preventing a breakage of the pin 15.

When it is desired to remove the pin holding apparatus from the pin slot 17 for changing the pin 15 with a new one or disassembling the pin-coupled parts from each other, the apparatus is compressed using a tool, the clamping arms of which are inserted into the holes 9 of the apparatus, and removed from the pin slot 17. Therefore, it is possible for a user to easily and simply set or remove the pin holding apparatus of this invention into or from a desired pin slot without causing damage to a pin, the pin slot or the pin holding apparatus.

As described above, the present invention provides an apparatus for holding a pin in a pin-coupled structure. This pin holding apparatus has two pin holding blocks with an elastic member interposed between the two pin holding blocks, and holds a pin at its desired position inside a pin slot by the protruding portions of the pin holding blocks set in an annular groove formed on the inner surface of the pin slot.

The pin holding apparatus of this invention firmly holds a pin in a pin slot for a desired lengthy period of time since the apparatus is not abraded or undesirably loosened. This pin holding apparatus is also easily set in or removed from the pin slot.

This pin holding apparatus firmly holds a pin in a pin slot for a desired lengthy period of time regardless of a relative movement of pin-coupled parts, and uses an elastic cushion at the junction of the pin and the apparatus, thus preventing a breakage of the pin.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for holding a pin in a pin-coupled structure consisting of two or more parts each having a pin slot, with an annular groove formed on an inner surface of the pin slot at a position around an end of the pin slot, and a pin set in said pin slot to couple said parts to each other, wherein the apparatus comprises:

two pin holding blocks each made of an incompressible material and each having on an upper portion thereof a laterally protruding portion which has at a lower edge thereof a junction surface extending laterally outwardly from a remaining part of the block; and an elastic member interposed between the two blocks, whereby the apparatus can be inserted into the pin slot while being compressed in a radial direction by an external force to reduce an outer diameter thereof, and then released from the external force, so that the apparatus can elastically expand by a restoring force of the elastic member and the protruding portions of the two blocks can be seated in the annular groove, thus holding the pin in the pin slot without allowing the pin to be undesirably removed from the pin slot regardless of a relative movement of the pin-coupled parts.

2. The apparatus according to claim 1, wherein said elastic member is made of rubber.

3. The apparatus according to claim 1, wherein each of said two blocks is made of steel, and the junction surface is inclined relative to an outer surface of said remaining Dart of the block.

4. The apparatus according to claim 3, wherein said junction surface is inclined at an angle of 30°.

5. The apparatus according to claim 3, wherein each of the two blocks has a cylindrical hole on an upper surface thereof for allowing a user to compress the apparatus in the radial direction using a tool.

6. The apparatus according to claim 3, wherein a half width "v" of said elastic member in a direction toward each of the blocks is set to 20~50% of a distance from a center of said elastic member to an outside edge of the protruding portion of each of the blocks.

7. The apparatus according to claim 3, wherein a length "h" of the elastic member is smaller than that of each of the two blocks.

8. An apparatus for holding a pin in a pin-coupled structure consisting of two or more parts each having a pin slot, with an annular groove formed on an inner surface of the pin slot at a position around an end of the pin slot, and a pin set in said pin slot to couple said parts to each other, wherein the apparatus comprises:

two pin holding blocks each having a protruding portion on an external surface thereof and made of an incompressible material;

an elastic member interposed between the two blocks; and an elastic cushion having a cross-section similar to that of the pin and covering lower ends of said two blocks and said elastic member, whereby the apparatus can be inserted into the pin slot while being compressed in a radial direction by an external force to reduce an outer diameter thereof with the elastic cushion coming into contact with an end of the pin, and then released from the external force, so that the apparatus can elastically expand by a restoring force of the elastic member and the protruding portions of the two blocks can be seated in the annular groove, thus holding the pin in the pin slot without allowing the pin to be undesirably removed from the pin slot regardless of a relative movement of the pin-coupled parts.

9. The apparatus according to claim 8, wherein said elastic member and said elastic cushion are made of rubber.

10. The apparatus according to claim 8, wherein each of said two blocks is made of steel, and the protruding portion is formed on an upper portion of each of the blocks, with a lower edge of the protruding portion integrated with a remaining part of the block through an inclined junction surface.

11. The apparatus according to claim 8, wherein said elastic cushion is formed to be concave on a lower surface thereof, thus allowing a force applied from the pin to be concentrated to an outside edge of said concave lower surface.

12. The apparatus according to claim 8, wherein said elastic member and said elastic cushion are cast into a single elastic body, and the two blocks are bonded to the single elastic body prior to being compressed together to be integrated with the elastic body into a single body.

13. The apparatus according to claim 8, wherein each of the two blocks has a cylindrical hole on an upper surface thereof for allowing a user to compress the apparatus in the radial direction using a tool.

14. The apparatus according to claim 8, wherein a half width "V" of said elastic member in a direction toward each of the blocks is set to 20~50% of a distance from a center of said elastic member to an outside edge of the protruding portion of each of the blocks.

15. The apparatus according to claim 14, wherein a length "h" of the elastic member is smaller than that of each of the two blocks.

* * * * *